(12) United States Patent
Hourtane

(10) Patent No.: US 10,710,465 B2
(45) Date of Patent: Jul. 14, 2020

(54) POSITIONING SYSTEM OF AN ELECTRIC VEHICLE IN RELATION TO A RECHARGING STATION

(71) Applicant: ALSTOM Transport Technologies, Saint-Ouen (FR)

(72) Inventor: Jean-Luc Hourtane, Bouc Bel Air (FR)

(73) Assignee: ALSTOM Transport Technologies, Saint-Ouen (FR)

(*) Notice: Subject to any disclaimer, the term of this patent is extended or adjusted under 35 U.S.C. 154(b) by 69 days.

(21) Appl. No.: 16/197,983

(22) Filed: Nov. 21, 2018

(65) Prior Publication Data
US 2019/0152334 A1  May 23, 2019

(30) Foreign Application Priority Data

Nov. 22, 2017  (FR) ..................................... 17 61068

(51) Int. Cl.
| H02J 7/00 | (2006.01) |
| B60L 53/126 | (2019.01) |
| G01D 5/20 | (2006.01) |
| B60L 53/36 | (2019.01) |
| B60L 53/14 | (2019.01) |

(52) U.S. Cl.
CPC ............ *B60L 53/126* (2019.02); *B60L 53/14* (2019.02); *B60L 53/36* (2019.02); *G01D 5/2006* (2013.01); *H02J 7/0027* (2013.01)

(58) Field of Classification Search
CPC ... Y02T 90/14; Y02T 10/7005; Y02T 90/128; Y02T 10/7088; Y02T 90/163
See application file for complete search history.

(56) References Cited

U.S. PATENT DOCUMENTS

| 9,379,571 B2* | 6/2016 | Boyer ................. B60L 11/1829 |
| 2008/0319596 A1* | 12/2008 | Yamada .................. B60L 58/13 701/22 |

(Continued)

FOREIGN PATENT DOCUMENTS

| DE | 102014214671 A1 | 1/2016 |
| DE | 102014215350 A1 | 2/2016 |

(Continued)

OTHER PUBLICATIONS

French Preliminary Search Report dated Jul. 31, 2018 during the prosecution of French Patent Application No. 1761068.

*Primary Examiner* — Arun C Williams
(74) *Attorney, Agent, or Firm* — Troutman Sanders LLP

(57) ABSTRACT

This system allows the positioning of a vehicle in a recharging position with respect to a pad of a recharging station, wherein the vehicle carries a shoe gear which, once the vehicle is in the recharging position, is moved to come into contact with the pad. This system comprises: on the ground side, a generation module of a magnetic field, a characteristic quantity of which is a function of the position relative to a reference point of the generation module; and, on the onboard side, a magnetic field measuring module to measure the characteristic quantity and compare it with a reference value, in order to control the movement of the vehicle and stop it at a position relative to the reference point, wherein the relative position corresponds to the recharging position.

9 Claims, 2 Drawing Sheets

(56) References Cited

U.S. PATENT DOCUMENTS

| | | | |
|---|---|---|---|
| 2009/0011616 A1* | 1/2009 | Patwardhan | H01R 13/629 439/34 |
| 2011/0256737 A1* | 10/2011 | Lacour | B60L 3/0069 439/34 |
| 2011/0270476 A1* | 11/2011 | Doppler | B60L 53/64 701/22 |
| 2012/0206093 A1* | 8/2012 | Schaefer | H02J 7/0042 320/107 |
| 2015/0097522 A1* | 4/2015 | Herriot | H04L 67/12 320/108 |
| 2016/0052450 A1* | 2/2016 | Chan | H04W 4/024 340/988 |
| 2016/0241061 A1 | 8/2016 | Werner | |
| 2016/0288657 A1* | 10/2016 | Tokura | B60L 53/126 |
| 2017/0043672 A1* | 2/2017 | Araki | B60M 7/003 |
| 2018/0072174 A1* | 3/2018 | Krammer | B60L 3/00 |

FOREIGN PATENT DOCUMENTS

| | | | |
|---|---|---|---|
| EP | 3213955 A1 | 9/2017 | |
| JP | 5635134 B2 | 3/2014 | |

* cited by examiner

POSITIONING SYSTEM OF AN ELECTRIC VEHICLE IN RELATION TO A RECHARGING STATION

CROSS-REFERENCE TO RELATED APPLICATIONS

The present application claims priority from French Patent Application No. 17 61068 filed Nov. 22, 2017. The entire contents of which are incorporated herein by reference.

The present invention relates to recharging installations by conduction of an on-board electrical energy storage means on board a vehicle.

In what follows, if the example of a bus is more particularly used, other vehicles on tires or, more generally, other vehicles, may be considered, such as trams.

Among the various types of conduction recharging installations, are known, on the ground side, a pad implanted in the roadway and connected to a source of electrical power (such as a substation of an electricity network), and on the onboard side, a mobile shoe gear mounted under the vehicle body and designed to be lowered to come into contact with the pad when the vehicle is stopped in a recharging station and takes up a predetermined recharging position with respect to the pad. This predetermined recharging position ensures that the shoe gear is in front of the pad and that it will come into contact with the latter when it is lowered.

In order to place the vehicle in this recharging position, it is currently planned to have visual markings on the ground in order to allow the driver of the vehicle to determine where to stop his vehicle.

However, such positioning means are not sufficiently precise to ensure that the shoe gear is at the base of the pad and that, when it is lowered, the electrical contacts which are provided with the shoe gear are in contact with the corresponding electrical contacts carried by the pad, so that recharging may take place.

In particular, it is to be feared that if a contact of the shoe gear comes to bear on the edge of a contact of the pad, then the extent of the surfaces in electrical contact would be insufficient with respect to the electric power applied during the recharging, which could lead to the welding of the contact of the shoe gear to the contact of the pad.

The invention therefore aims to solve this problem.

For this purpose, the object of the invention is a system for positioning a vehicle equipped with an electrical energy storage means at a predetermined recharging position with respect to a ground pad of a recharging station, wherein the pad is electrically connected to a source of electrical power, while the vehicle carries a shoe gear that is electrically connected to the electrical energy storage means and which, once the vehicle is at the predetermined recharging position, is moved to come into electrical contact with the pad, characterized in that it comprises: on one side among a ground side and an onboard side, a module for generating a magnetic field, a characteristic quantity of which is a function of the position relative to a reference point of the generation module; on the other hand, a magnetic field measuring module that is able to measure the characteristic quantity and to compare it with a reference value, in order to control the movement of the vehicle and stop it at a predetermined relative position with respect to the reference point, wherein the predetermined relative position corresponds to the predetermined recharging position.

According to particular embodiments, the system comprises one or more of the following characteristics, taken separately or in any technically feasible combination:

- the module for generating a magnetic field is located on the ground, while the magnetic field measurement module is on board the vehicle.
- the module for generating a magnetic field is integrated in the pad, while the module for measuring the magnetic field is carried by the shoe gear.
- the magnetic field measuring module is carried by a contact of the shoe gear.
- the characteristic magnitude of the magnetic field is an intensity of the magnetic field in a vertical direction.
- the module for generating a magnetic field comprises a current loop arranged substantially horizontally and traversed by an induction current that is designed to generate the magnetic field, wherein the reference point is the geometric center of the loop.
- the current loop is shaped to present a central loop (76) and a plurality of peripheral loops, wherein the direction of flow of the induction current in the central loop is opposite to the direction of circulation of the induction current in the peripheral loops.
- the central loop is rectangular, in order to generate a substantially constant magnetic field characteristic quantity in a reference zone parallel to the plane of the central loop and lying, in projection in the direction perpendicular to the plane of the loop, inside the central loop, the characteristic quantity falls rapidly outside the reference zone, along the plane of the central loop.
- the measuring module comprises a Hall effect sensor suitable for measuring the intensity of the magnetic field in the vertical direction, as the characteristic quantity of the magnetic field.

The invention also relates to a conduction recharging installation comprising the preceding positioning system.

The invention and its advantages will be better understood upon reading the following detailed description of a particular embodiment, given solely by way of non-limiting example, wherein this description is made with reference to the appended drawings, wherein.

Figure 1:
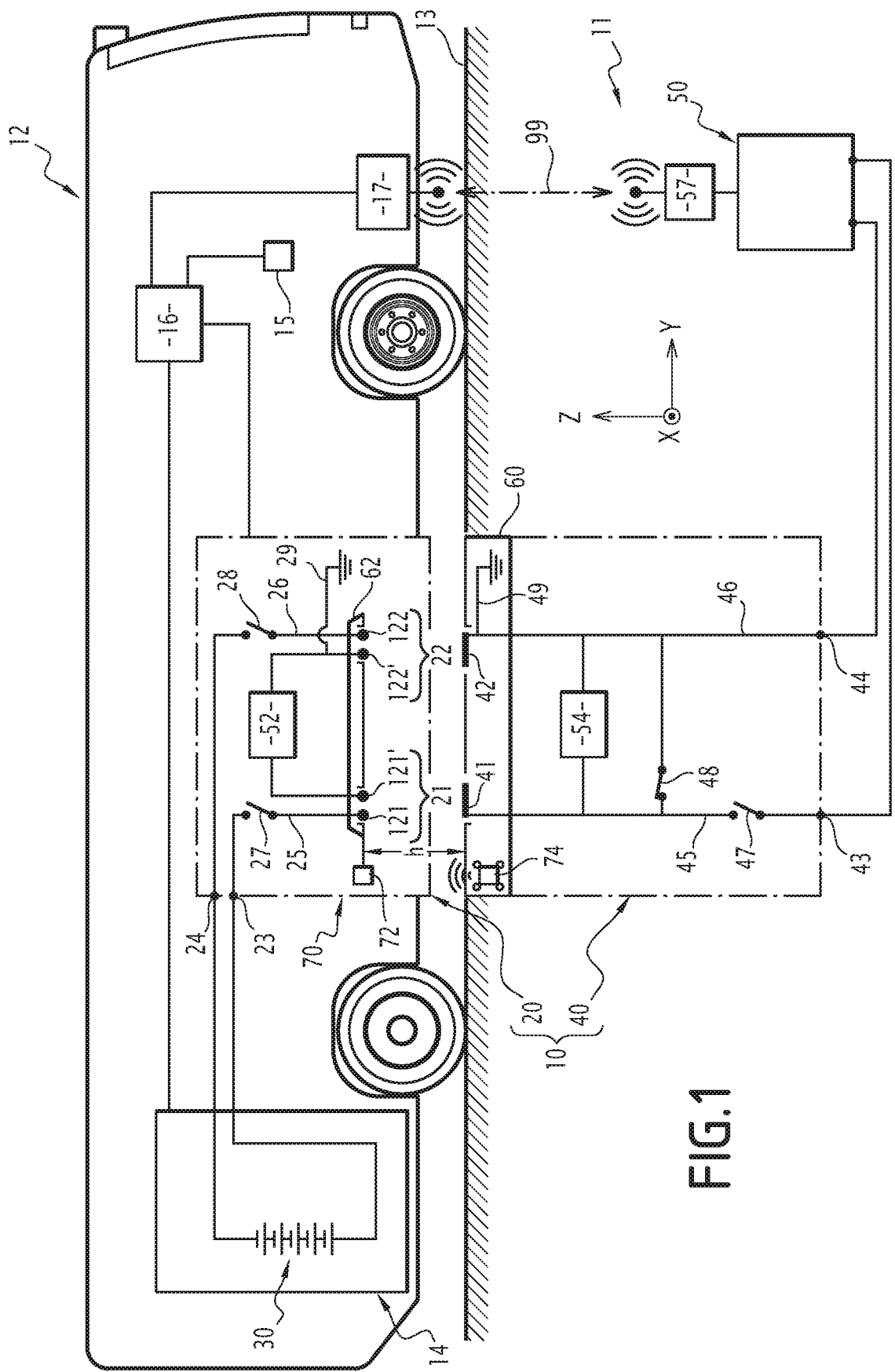
FIG. 1 shows a schematic representation of a conduction recharging installation incorporating the positioning system according to the invention.

FIG. 1 shows a conduction recharging installation 10 enabling the safe application of electrical power permanently delivered from a source 50 of a recharging station 11 to an electrical energy storage means 30 belonging to a power circuit 14 of a bus 12.

The bus 12 comprises a control device 16.

The bus 12 comprises an isolation measurement module 15, to ensure that the power circuit 14 is galvanically isolated from the chassis of the bus 12 at all times, except when recharging the means 30.

The bus 12 also comprises a radio communication module 17 that is capable of establishing a wireless communication link 99 with a radio communication module 57 carried by the source 50, in order to exchange data and adjust the characteristics of the electrical power of the recharging to be applied. This relates, for example, to a wireless link implementing a communication protocol according to the protocol known as Bluetooth®.

The installation 10 comprises an onboard recharging device 20, on board the bus 12. At the input in the embodiment presented here in detail, the device 20 comprises two contacts, wherein each contact comprises two electrodes, respectively a positive polarity contact 21, having a power electrode 121 and a ground electrode 121', and a negative polarity contact 22, having a power electrode 122 and a ground electrode 122'.

The onboard recharging device 20 is connected by first and second output terminals 23 and 24 at the output, to the terminals of the electrical energy storage means 30. The means 30 may consist, for example, of a battery, but also other technical solutions that are known to those skilled in the art.

The installation 10 comprises a ground recharging device 40 as part of the recharging station 11. The device 40 is connected, by first and second input terminals 43 and 44 at the input, to the terminals of the source 50. The source 50 is, for example, a substation of a power supply network.

At the output, the ground recharging device 40 comprises, in the embodiment presented here in detail, two contacts, respectively a positive polarity contact 41 and a negative polarity contact 42.

The contacts 41 and 42 of the ground recharging device 40 are integrated in a pad 60 implanted in the roadway 13 in order to have an upper surface that is flush with the surface of the busway of the bus 12.

The onboard recharging device 20 comprises a shoe gear 62, mounted under the body of the bus 12 and designed to move vertically between a high position and a low position.

In the high position, the shoe gear is at a height h above the surface of the roadway 13.

In the low position, and while the bus 12 is stopped in a predetermined recharging position, the positive polarity contact 21 of the on-board device 20 is in electrical contact with the positive polarity contact 41 of the ground device 40, while the negative polarity contact 22 of the onboard device 20 is in electrical contact with the negative polarity contact 42 of the ground device 40.

The on-board recharging device 20 comprises a positive polarity mesh 25, connecting the power electrode 121 to the output terminal 23 (connected to the positive polarity of the battery), via a contactor 27, and a negative polarity mesh 26 connecting the power electrode 122 to the output terminal 24 (connected to the negative polarity of the battery), via a contactor 28.

The device 20 comprises, between the grounding electrodes 121' and 122', an on-board ground control module 52.

The electrode 122' is electrically connected to the chassis of the bus 12 near the electrode 122' of the negative polarity contact 22. This is shown schematically in FIG. 1 by the ground link 29.

The ground recharging device 40 has a positive polarity cell 45, which connects the positive polarity contact 41 and the first input terminal 43, and a negative polarity cell 46, which connects the negative polarity contact 42 and the second input terminal 44. The positive polarity mesh 45 integrates a controlled contactor 47.

The device 40 comprises a safety switch 48 between the meshes of positive polarity and negative polarity.

Near the negative polarity contact 42, the negative polarity mesh 46 is electrically connected to a ground connection. This is shown schematically in FIG. 1 by the ground connection 49.

The device 40 comprises a ground module for control of the ground connection 54 between the positive polarity and negative polarity meshes.

The exchange of data between the ground control modules 52 and 54 makes it possible to ensure the grounding of the vehicle body at all times when the contacts 22 and 42 are brought into contact with one another, on the one hand, and the contacts 21 and 41, on the other hand, in particular throughout the recharging, in order to ensure the safety of people around the vehicle.

The installation 10 is equipped with a positioning system 70 comprising a generation module 74 on the ground that is designed to generate a magnetic field, while a measurement module 72 on board the bus 12 is designed to measure the magnetic field. generated by the generation module 74. Alternatively, the generation module may be on board the bus and the measurement module on the ground.

The measurement module 72 is designed to measure a characteristic quantity of the magnetic field, wherein this quantity is a function of the position of the measurement module with respect to a reference point of the generation module 74. In what follows, the characteristic quantity in question is the intensity of the magnetic field in the vertical direction Z passing bx the point of implantation of the generation module 74.

Preferably, the generation module 74 is integrated in the pad 60, while the measurement module 72 is integrated in the shoe gear 72.

Figure 2:
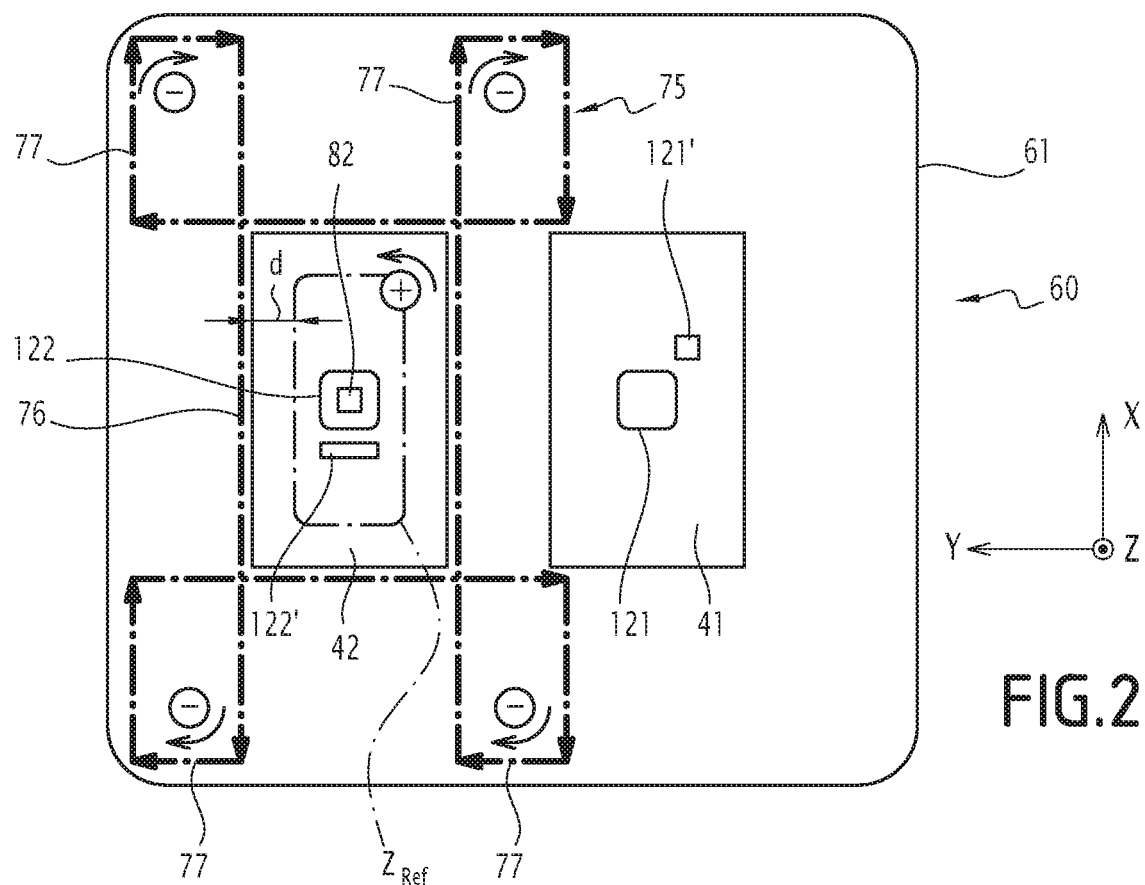
FIG. 2 shows a schematic representation in top view of the positioning system representing both the on-board part and the ground part of this system; and, FIG. 3 shows a representation as a function of the spatial position of an iso-intensity surface of the vertical component of the magnetic field generated by the ground portion of the location system.

As shown in more detail in FIG. 2, the upper surface of the pad 60 has a frame 61 around the contacts 41 and 42 respectively of positive polarity and negative polarity.

The contacts 41 and 42 are flat and lie in the same substantially horizontal plane XY at the surface of the roadway 13. They are of rectangular shape, for example 300 mm long by 500 mm wide. They are arranged in parallel and spaced apart in a direction Y.

The frame 61 with the shape of an "eight", surrounds the contacts 41 and 42.

FIG. 2 also shows the electrodes of negative polarity 122 and 122', and the electrodes of positive polarity 121 and 121' carried by the shoe gear 62. These electrodes have dimensions that are smaller than those of the contacts 41 and 42 of the pad 60. The power electrodes 121 and 122 are of substantially square section, for example 50 mm on each side.

In the predetermined recharging position, the power electrodes 121 and 122 are respectively aligned with the centers of the contacts 41 and 42. This is shown in FIG. 2.

The measurement module 72 comprises a sensor 82, for example a Hall effect sensor, that is designed to measure the intensity of the magnetic field, for example the intensity Bz in the vertical direction Z. It is, in particular, designed to determine the sign of this intensity, i.e. the direction of the magnetic field in the vertical direction Z. In the embodiment of FIG. 2, the sensor 82 is placed at the center of the power electrode 122 of the negative polarity contact 22 of the shoe gear 62.

The generation module 74 comprises a current loop 75 as shown in FIG. 2. The loop is integrated in the frame 61 in order to lie in a substantially horizontal plane XY, preferably the horizontal plane of the free surface of the contacts 41 and 42 that are conventionally placed on the scale Z=0. The loop 75 is preferably symmetrical with respect to a reference point.

The current loop 75 comprises a central loop 76 and four peripheral loops 77. The central loop 76 is rectangular and surrounds the negative polarity contact 42. Each peripheral loop 77 touches a corner of the central loop 76 at one of its corners. The reference point of the loop 75 then corresponds to the center of the central loop 76, and coincides with the center of the negative polarity contact 42.

The loop 75 is traversed by induction currents.

An induction current flows in the central loop 76 in a first direction (designated positive in FIG. 2), while, an induction current flows in a second direction in the peripheral loops 77 that is opposite to the first direction (designated negative in FIG. 2).

Advantageously, the loop 75 is made from a single wire or wire bundle twisted upon itself in order to form both the central loop 76 and the peripheral loops 77, while allowing the same induction current to flow in each elementary loop 76, 77 in accordance with the directions indicated above.

Figure 3:
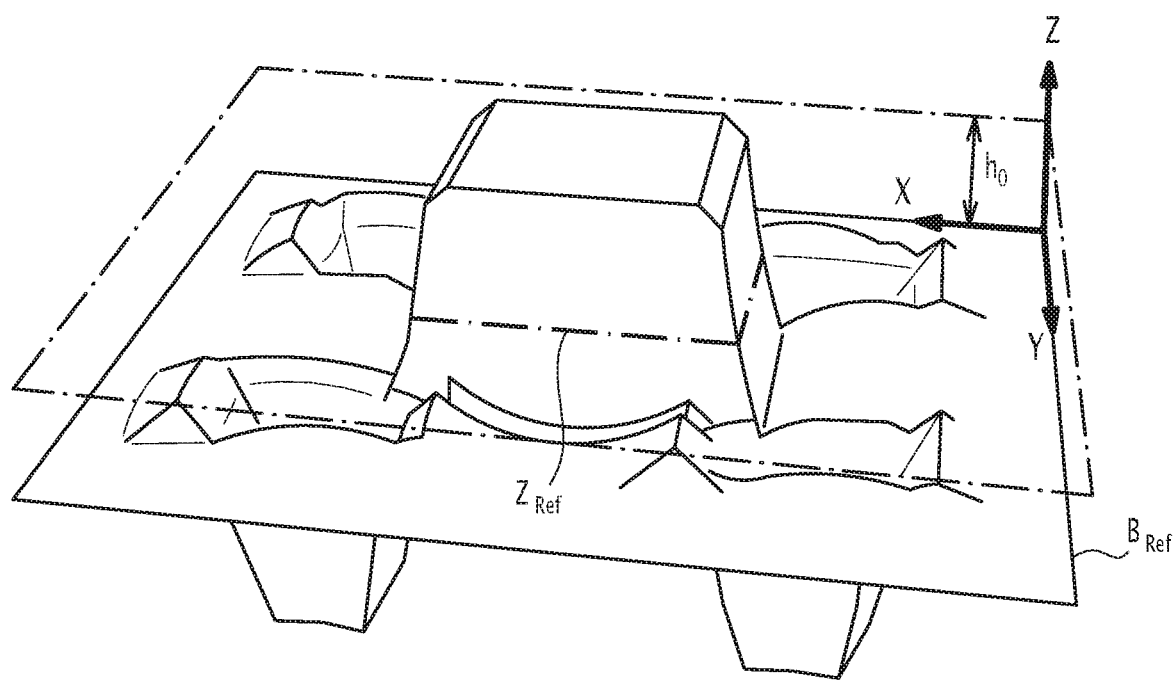

FIG. 3 represents a surface in the X, Y, Z coordinate centered on the reference point of the generation module, i.e. the center of the loop 75. This surface is an iso-intensity surface connecting the points where the intensity of the component in the Z direction of the magnetic field is constant.

The intersection of an iso-intensity surface of the residual field with a measurement plane located above the plane of the loop defines a generally rectangular zone that is inscribed, in projection, inside the central loop 76. The center of this rectangular zone corresponds, in projection in the vertical direction Z, to the center of the loop 75. The intensity of the magnetic field decreases rapidly upon moving away from this zone in the direction X or Y.

Thus, by adapting the intensity of the induction current passing through the loop 75, and by taking into account the height ho between the measurement sensor 82 and the XY plane of the loop 75 in the high position of the shoe gear 62, it is possible to define a reference zone ($Z_{Ref}$ in FIG. 2), whose edges in the XY plane are distant from the edges of the negative polarity contact 42, by a distance d that is greater than the dimension of the power electrode 122 of the negative polarity contact 22 (FIG. 2). The distance d is, for example, greater than 50 mm. This reference zone $Z_{Ref}$ is associated with a reference value $B_{Ref}$ of the intensity of the magnetic field in the Z direction.

Thus, during the approach of the bus 12 to the recharging station 11, the measurement module 72 compares at each instant the value measured by the sensor 82 with the reference value, $B_{Ref}$. When the sensor 82 measures an intensity of the magnetic field greater than the reference value $B_{Ref}$, the measurement module 72 knows that the sensor 82 has entered the zone $B_{Ref}$ and that it is in an acceptable position relative to the generation module 74, i.e. in a position of alignment with the reference point of the generation module 74, subject to a tolerance. The measurement module 72 then sends a signal to the control device 16 of the bus 12 in order to command the immediate stopping of the bus 12.

In the present embodiment, since the induction loop 75 is centered on the negative polarity contact 42 of the pad 60, while the detector 82 is centered on the power electrode 122 of the negative polarity contact 22 of the shoe gear 62, the alignment position of the sensor 82 and the reference point of the generation module 74 coincides with the predetermined recharging position, in which the power electrode 122 of the negative polarity contact 22 is aligned with the center of the negative polarity contact 42, while the power electrode 121 of the positive polarity contact 22 is aligned with the center of the positive polarity contact 41.

In this position, the shoe gear may be lowered with the certainty that its contacts will come into correct electrical contact with the contacts of the pad, in particular that they will not come into electrical contact with the edges of the contacts of the pad, thus avoiding any risk of welding.

Alternatively, the positions of the magnetic field sensor and the current loop may be respectively offset with respect to the shoe gear and the pad, so that when the sensor and the current loop are in a predetermined relative position, the contacts of the shoe gear and pads are also. This configuration makes it possible to implant the current loop 75 of the generation module and the sensor 82 of the measurement module at a distance from the pad and the shoe gear, and so simplify the devices on the ground and on board.

In the present description, the shoe gear is presented as having a simple vertical movement. Alternatively, the shoe gear may be moved to come into contact with the pad along a different path. However, since this path is predetermined, it makes it possible to implant the measuring means and the generating means in relative positrons, so that the vehicle is stopped at the adapted recharging position.

In another variant, independent of the previous ones, the recharging pad has three contacts, neutral, phase and ground, respectively, while the shoe gear comprises three contacts, respectively neutral, phase and ground, wherein each contact of the shoe gear comprises a single electrode. The newly presented system stops the vehicle in a predetermined recharging position, so that the displacement of the shoe gear is applied against the pad so that each pair of contacts is correctly established.

The positioning system according to the invention is particularly simple to implement. It is robust. It offers reduced manufacturing and maintenance costs. Other solutions may be proposed comprising, for example, a camera and an articulated shoe gear in order to allow the driver, once his vehicle has stopped, to guide the lowering of the shoe gear and bring it on the pad. Such solutions are complex and expensive. They are not suitable for equipping a fleet of vehicles quickly and inexpensively.

The invention claimed is:

1. Positioning system for positioning a vehicle equipped with an electrical energy storage means in a predetermined recharging position with respect to a pad of a ground recharging station, the pad being electrically connected to an electrical power source and the vehicle carrying a shoe gear, the shoe gear being electrically connected to the electrical energy storage means and, once the vehicle is in the predetermined recharging position, being movable to come into an electrical contact with the pad, wherein the positioning system comprises:
   on one side among the ground recharging station and the vehicle, a generation module for generating a magnetic field, a characteristic quantity of which is a function of a position with respect to a reference point associated with the generation module;
   on the other side, a measuring module of the magnetic field, the measuring module being designed to measure the characteristic quantity and compare it with a reference value in order to control the movement of the vehicle and stop the vehicle at a predetermined relative position with respect to the reference point, the predetermined relative position corresponding to the predetermined recharging position.

2. System according to claim 1, wherein the generation module of a magnetic field is located on the ground, while the measuring module of the magnetic field is onboard the vehicle.

3. System according to claim 2, wherein the generation module of a magnetic field is integrated in the pad, and the measuring module of the magnetic field is carried by the shoe gear.

4. System according to claim 3, wherein the measuring module of the magnetic field is carried by a contact on the shoe gear.

5. System according to claim 1, wherein the characteristic quantity of the magnetic field is an intensity of the magnetic field along a vertical direction.

6. System according to claim 1, wherein the generation module of a magnetic field comprises a current loop, that is arranged substantially horizontally and is traversed by an induction current designed to generate the magnetic field, the reference point being the geometric center of the loop.

7. System according to claim 6, wherein the current loop comprises a central loop and a plurality of peripheral loops and wherein a flow direction of the induction current in the central loop is opposed to a flow direction of the induction current in the peripheral loops.

8. System according to claim 7, wherein the central loop is rectangular, in order to generate a substantially constant characteristic quantity of the magnetic field in a reference zone, which is parallel to the plane of the central loop and inscribed inside the central loop in projection in a direction perpendicular to the plane of the loop, the characteristic quantity decreasing rapidly outside the reference zone, along the plane (XY) of the central loop.

9. System according to claim 5, wherein the measuring module comprises a Hall effect sensor to measure the intensity of the magnetic field in the vertical direction as the characteristic quantity of the magnetic field.

\* \* \* \* \*